(12) United States Patent
Reeve

(10) Patent No.: US 6,888,835 B2
(45) Date of Patent: May 3, 2005

(54) BUFFER MANAGEMENT

(75) Inventor: Andrew Reeve, Winchester (GB)

(73) Assignee: Roke Manor Research Limited, Romsey (GB)

( * ) Notice: Subject to any disclaimer, the term of this patent is extended or adjusted under 35 U.S.C. 154(b) by 836 days.

(21) Appl. No.: 09/898,485

(22) Filed: Jul. 5, 2001

(65) Prior Publication Data
US 2002/0024963 A1 Feb. 28, 2002

(30) Foreign Application Priority Data

| Jul. 5, 2000 | (GB) | ............................................. 0016474 |
| Oct. 10, 2000 | (GB) | ............................................. 0024735 |

(51) Int. Cl.⁷ .......................... H04L 12/56; H04Q 11/04
(52) U.S. Cl. .................................. 370/395.52; 370/474
(58) Field of Search ........................... 370/395.52, 474; 711/154

(56) References Cited

U.S. PATENT DOCUMENTS

| 5,809,024 | A |   | 9/1998 | Ferguson et al. ........... 370/395 |
| 5,870,394 | A |   | 2/1999 | Oprea ........................ 370/392 |
| 5,898,688 | A |   | 4/1999 | Norton et al. ............... 370/362 |
| 5,905,889 | A | * | 5/1999 | Wilhelm, Jr. ................ 718/104 |
| 5,920,561 | A |   | 7/1999 | Daniel et al. ................ 370/395 |
| 5,999,980 | A | * | 12/1999 | Tanaka et al. ............... 709/235 |
| 6,026,090 | A | * | 2/2000 | Benson et al. ........... 370/395.7 |
| 6,148,001 | A |   | 11/2000 | Soirinsuo et al. ........... 370/420 |
| 2002/0061018 | A1 | * | 5/2002 | Chien ........................ 370/389 |
| 2002/0181450 | A1 | * | 12/2002 | Sokol et al. ................. 370/364 |
| 2004/0107318 | A1 | * | 6/2004 | Bono et al. .................. 711/118 |

FOREIGN PATENT DOCUMENTS

| EP | 0 404 078 A2 | 6/1990 |
| GB | 2344974 | 6/2000 |
| WO | 9836358 | 8/1998 |

OTHER PUBLICATIONS

British Search Report, GB0024735.3 May 2001.
D. Fonseca, "On the Effectiveness of the Longest–Packet–In Selective Packet Discarding Policy" The Bridge to Global Integration, 1998.
D. Smith, "Sizing a Packet Reassembly Buffer at a Host Computer in an ATM Network" ACM Transactions on Networking, 1995.
Copy of the Search Report, EP 01202199.

* cited by examiner

Primary Examiner—Melvin Marcelo
(74) Attorney, Agent, or Firm—Crowell & Moring LLP

(57) ABSTRACT

Described herein is a method for reassembling variable length packets from fixed length cells. When a variable length packet, for example, an Internet Protocol (IP) packet, is transmitted between routers over a link which transmits data as fixed length cells, for example, an asynchronous transfer mode (ATM) link, the packet must be segmented into compatible fixed length cells. The receiving router must reassemble the original packet from the cells as they arrive. A packet buffer free pool (300) is provided which is maintained as a linked list, known as a 'free list', and which comprises a plurality of buffer elements (302, 304, 306, 308, 310, 312, 314, 316, 318, 320, 322, 324, 326, 328, 330, 332, 334, 336, 338, 340). When a first cell for a given packet arrives, a buffer element (302) is taken from the head of the free list and allocated to that packet. The packet data from the first and subsequent cells is copied into the allocated buffer element and each time the buffer element is moved to the end of the free list. Upon the arrival of the last cell for the given packet, the complete packet is processed. Failed reassemblies are automatically abandoned as the buffer element is reused when it reaches the head of the free list. This technique is relevant to protection against "denial of service" attacks upon computer networks.

2 Claims, 3 Drawing Sheets

BUFFER MANAGEMENT

The present invention relates to improvement in or relating to buffer management, and is more particularly concerned with reassembly buffer management.

In the Internet, data is transferred over a global network of heterogeneous computers by means of a plurality of routing devices in accordance with a standard protocol known as Internet Protocol (IP). IP is a protocol based on the transfer of data in variable sized portions known as packets. All network traffic involves the transportation of packets of data.

In Asynchronous Transfer Mode (ATM) networks, data is transferred in small cells of a fixed length, typically carrying 48 bytes of data. ATM allows high transmission rates by keeping the overheads due to communication protocols to a minimum and by implementing the majority of the communication protocols in hardware. In particular, ATM routing is achieved entirely in hardware. In ATM, virtual circuits between senders and destinations called virtual channels are established, the set-up and the maintenance of the virtual channels being implemented in hardware to minimise switching delays.

Routers are devices for accepting incoming packets; temporarily storing each packet; and then forwarding the packets to another part of the network. For the purposes of the following description the term 'routing device' refers to any device which performs the function of a router or a circuit switch. One relevant example of a routing device is an ATM to IP switch.

There is an urgent requirement for routing devices that can route IP traffic at extremely large aggregate bandwidths in the order of several terabits per second. Such routing devices are termed "terabit routers".

When an IP packet is transmitted between routers over an ATM link, the packet must be segmented into fixed length ATM cells. The receiving router must reassemble the original packet from the cells as they arrive.

Conventional reassembly proceeds as follows:

First, a free pool of packet buffers (or reassembly buffers) is maintained. Secondly, on arrival of the first cell for a given packet, a packet buffer is allocated from the free pool. Packet data is copied from the cell into the buffer and a timer is started. The timer is known as a reassembly timer whose function is to protect the system from lost cells.

Upon arrival of each subsequent cell for the given packet, except the last, packet data is copied from the cell into the buffer. After each new copy event, the reassembly timer is restarted. On arrival of the last cell for the given packet, packet data is again copied from the cell into the buffer and the reassembly timer is stopped. The new complete packet is processed and transmitted to its intended destination or destinations. The buffer is then returned to the free pool.

If the reassembly timer expires, it is assumed that one or more cells have been lost or corrupted. In this case, the reassembly is abandoned and the buffer is returned to the free pool.

It is important to note, however, that the router must perform multiple concurrent reassemblies. Typically, the router will have a number of ATM virtual circuits open, each carrying data from IP packets. Within any one virtual circuit, the cells for a given packet will arrive contiguously. However, the cells for the given packet arriving on different virtual circuits will be interspersed relative to one another, which also means that cells from different packets will be interspersed. It is possible that concurrent reassemblies be required for each virtual circuit, each requiring its own timer. For high capacity routers with large numbers of virtual circuits, large numbers of timers are required.

It is therefore an object of the invention to obviate or at least mitigate the aforementioned problems.

In accordance with one aspect of the present invention, there is provided a method of operating a reassembly buffer function, the method comprising the steps of:

a) receiving a first fragment from a new packet;
b) allocating a buffer location to the new packet;
c) moving the allocated buffer location to the end of a buffer list;
d) receiving subsequent fragments and passing them to the allocated buffer location and repeating step c);
e) transmitting reassembled packet from the allocated buffer location when the last fragment has been received;
f) allowing the allocated buffer location to reach the top of the buffer list if no further fragments are received; and
g) reusing the allocated buffer location when it reaches the top of the buffer list.

A fragment is defined as a part of a packet of data which is transmitted separately due to the constraints of a network. A fragment may be a cell or an IP fragment.

An advantage of the present invention is that it allows the reassembly of variable length packets from fixed length cells in the absence of reassembly timers.

In one embodiment of the present invention, a method for reassembling variable length Internet Protocol (IP) packets from fixed length Asynchronous Transfer Mode (ATM) cells in the absence of reassembly timers is provided.

For a better understanding of the present invention, reference will now be made, by way of example only, to the accompanying drawings in which.

Figure 1:
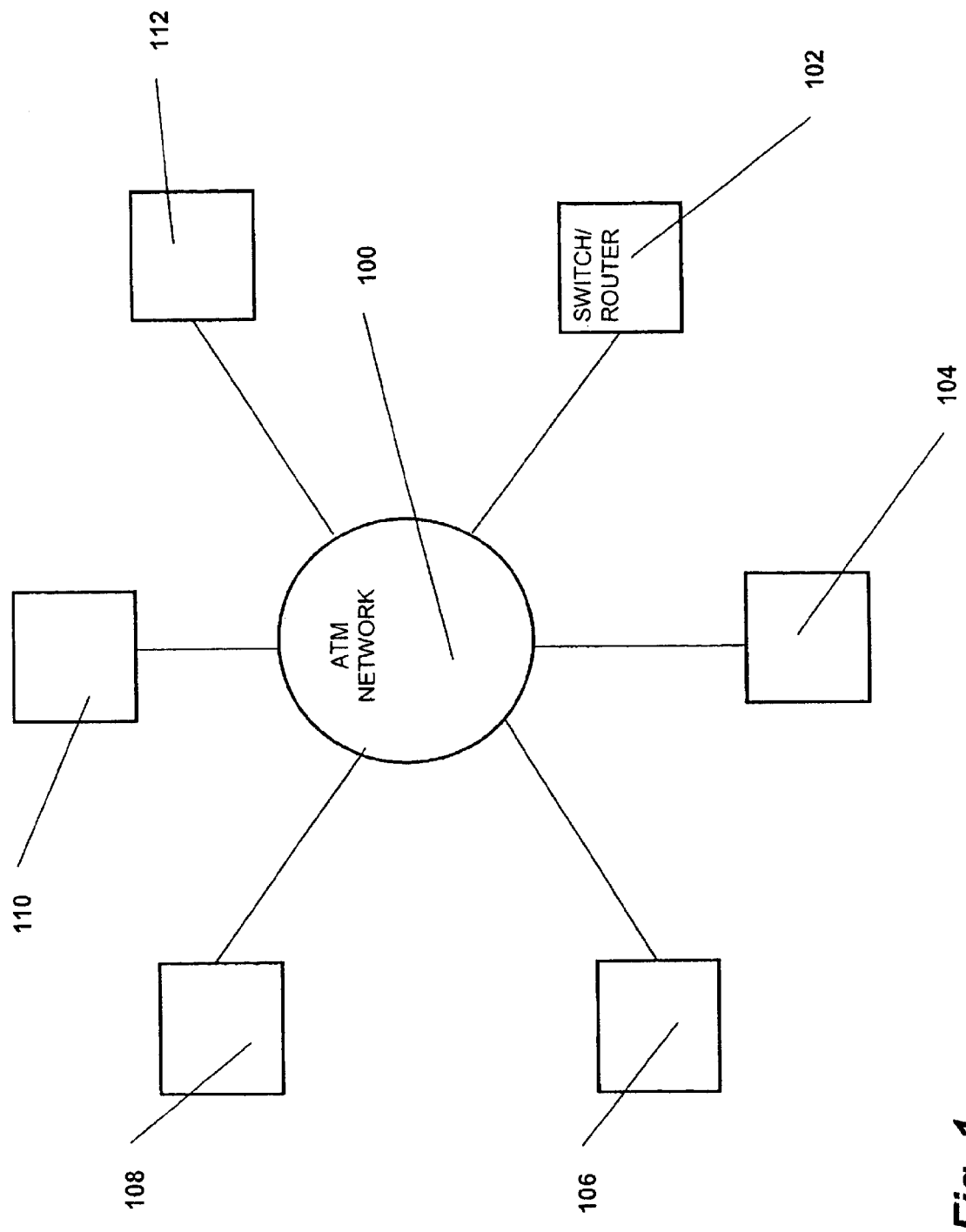
FIG. 1 illustrates an ATM network.

FIG. 1 illustrates an ATM network 100 to which are connected a plurality of packet switches or routers 102, 104, 106, 108, 110, 112. Although only six packet switches or routers are shown, it will be appreciated that any number of such switches or routers may be connected to the network 100 as required by a particular application.

Each packet switch 102, 104, 106, 108, 110, 112 is connected to each of the packet switches via the network 100. Although the network 100 is described as an ATM network, it may also be an internet protocol (IP) network.

Each packet switch 102, 104, 106, 108, 110, 112 can be considered to be an interface unit for a terabit router (not shown). Such a router, for example, RipCore (Registered Trade Mark), comprises a plurality of interface units, each interface unit having to support interface speeds of 2.5, 10 and 40 Gigabits per second. Therefore, packet handling has to be as simple as possible to allow the higher levels of hardware integration required and reduce development risk.

The present invention will now be described with reference to a terabit router, but it will readily understood that it is equally applicable to packet switches or any device where packet data reassembly needs to take place. One particular instance where packet data reassembly is required is at the ingress to a packet switch or a terabit router.

Figure 2:
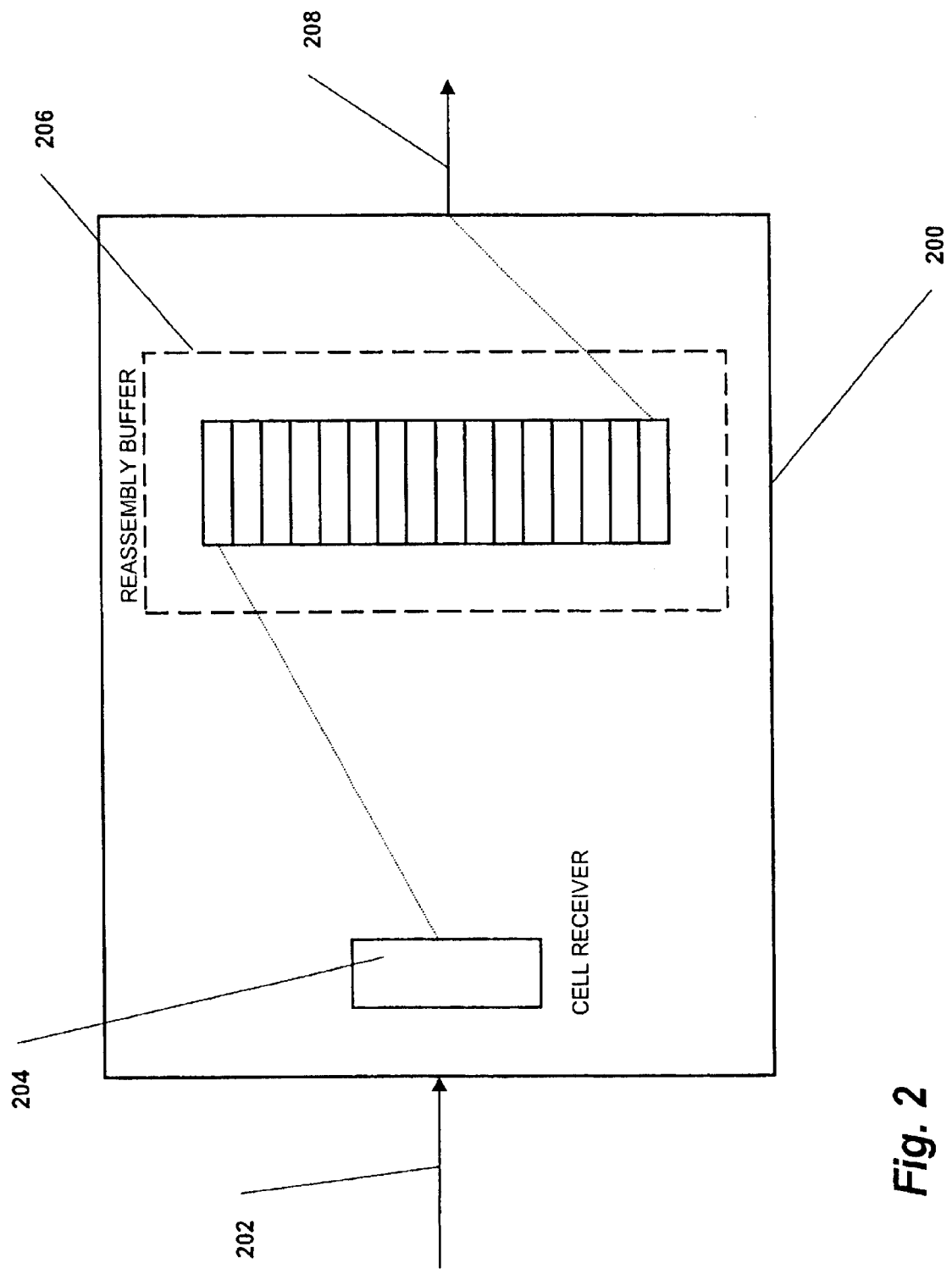
FIG. 2 illustrates a device for reassembling packets of data in accordance with the present invention.

FIG. 2 illustrates a terabit router 200 which comprises an input 202 for receiving packets of data, in the form of cells, from a network (not shown). The router 200 includes a cell receive function 204 for receiving individual cells from the network and forwarding the cells to a reassembly buffer 206 where the cells are collected and reassembled into their original packets of data. The reassembled cells are output from the router 200 on output 208. The buffer 206 is described in more detail with reference to FIG. 3.

Figure 3:
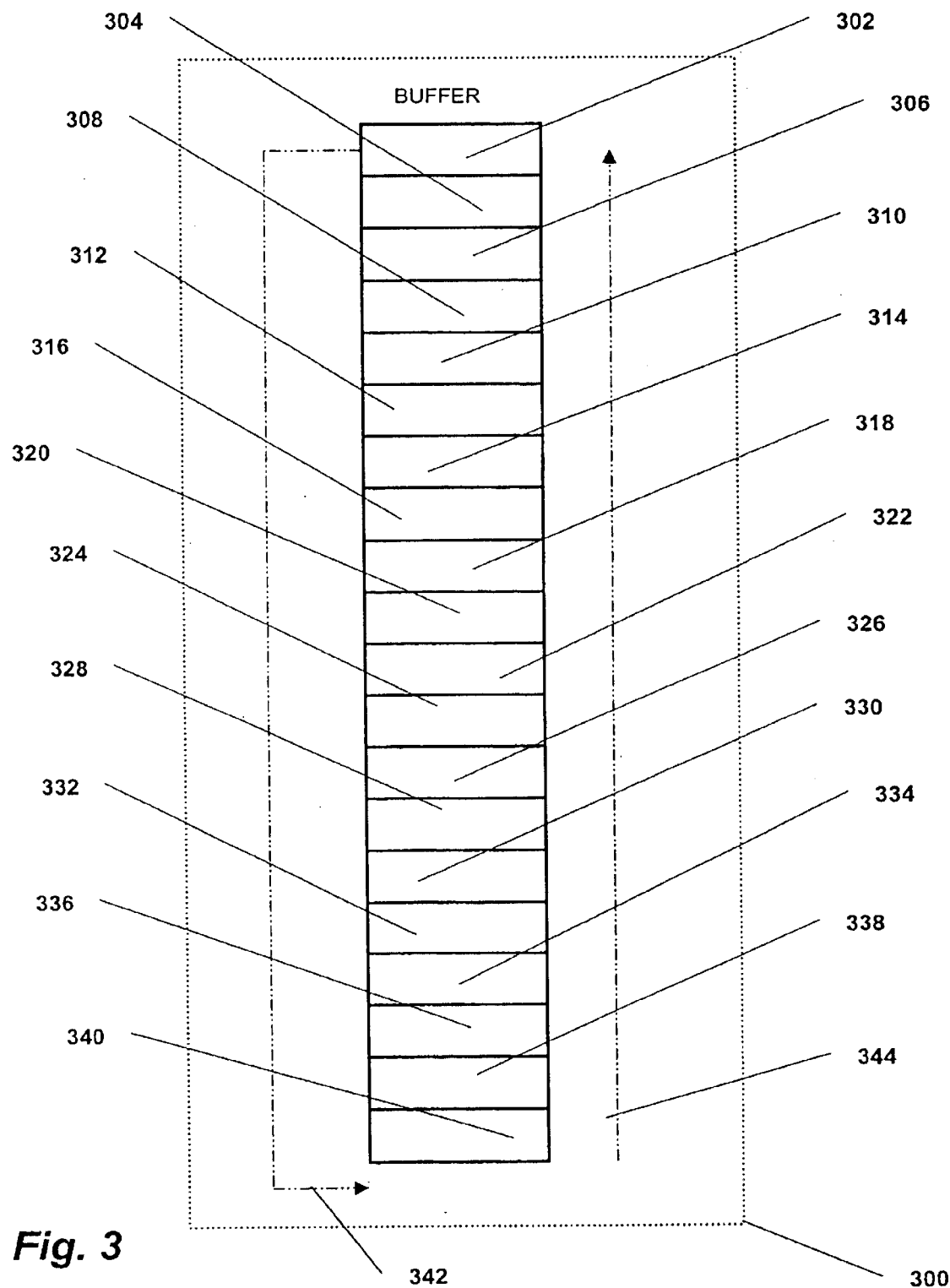
FIG. 3 illustrates a buffer comprising a part of the FIG. 2 device.

In FIG. 3, the buffer 300 comprises a plurality of buffer elements 302, 304, 306, 308, 310, 312, 314, 316, 318, 320, 322, 324, 326, 328, 330, 332, 334, 336, 338, 340 arranged in a list. It will be appreciated that, although twenty buffer elements are shown, any suitable number can be employed in accordance with a particular application.

As shown in FIG. 3, element 302 is at the top of the list and is therefore free for use, element 340 contains at least one cell from a packet, and element 318 may contain a substantially reassembled packet. This is given by way of example. It will be appreciated that element 318 may also be free as it is in the middle of the list. Furthermore element 340 may also be free if the packet reassembly has only just begun.

In an embodiment of the present invention, the following steps are implemented on a terabit router: First, a packet buffer free pool, buffer 300, is maintained as a linked list. The linked list is known as a 'free list'.

When the first cell for a given packet arrives, a buffer element is taken from the head of the free list, for example, buffer element 302, and the packet data from the first cell is copied into that buffer element. The buffer element is then moved to the end of the free list, as shown by arrow 342. Buffer element 340 then moves off the end of the list in the direction indicated by arrow 344.

On arrival of subsequent cells for the given packet, excluding the last, the packet data is copied into the relevant buffer element and the buffer element is moved to the end of the free list.

On arrival of the last cell for the given packet, the packet data from the last cell is copied to the buffer element and the complete packet is processed, and passed to output 208 as shown in FIG. 2. Once the reassembly has taken place, the buffer element moves up the list in the direction indicated by arrow 344 until it is at the top of the list and the process re-starts for a new packet.

If cells for a packet are lost so that the complete packet is never received, the buffer element will eventually, as a result of buffer allocations for other packets, reappear at the head of the free list, as indicated by arrow 344, and be re-used for a new packet. The failed reassembly is automatically abandoned.

This is repeated for each individual packet of data so that only one buffer element collects cells relating to a particular packet of data, and there is an effective time out when the buffer element reaches the top of the list.

It will be readily appreciated that this technique could also be used for protection against certain so-called "denial of service" attacks upon computer networks.

IP supports packet fragmentation to allow large packets to be transmitted over networks which contain links with physical limits on their packet sizes. Accordingly, a large packet may be broken into a number of small packets to be reassembled at their ultimate destination. This makes the network vulnerable to attack. A hostile agent may send to its target a large number of single fragments each identified as belonging to larger packets, but for which no subsequent fragments are sent. The target (using a conventional reassembly scheme as described above) will reserve resources for each reassembly, resulting in buffer exhaustion. It is difficult to combat this sort of attack through the use of reassembly timers since if the timers were to be short enough to be effective, they would not be long enough to accommodate the arrival of real fragmented packets.

A target using a reassembly scheme in accordance with the present invention is much less likely to suffer buffer exhaustion under such denial of service attacks. Bogus fragments do waste bandwidth but have no ultimate effect on the free pool.

What is claimed is:

1. A method of operating a reassembly buffer function, the method comprising the steps of:

a) receiving a first fragment from a new packet;
   b) allocating a buffer location to the new packet;
   c) moving the allocated buffer location to the end of a buffer list;
   d) receiving subsequent fragments and passing them to the allocated buffer location and repeating step c);
   e) transmitting reassembled packet from the allocated buffer location when the last fragment has been received;
   f) allowing the allocated buffer location to reach the top of the buffer list if no further fragments are received; and
   g) reusing the allocated buffer location when it reaches the top of the buffer list.

2. A method according to claim 1, further comprising the step of using the position of the allocated buffer location in the buffer list to effect timing for receipt of fragments from each packet.

* * * * *